(12) United States Patent
Jung et al.

(10) Patent No.: US 8,314,910 B2
(45) Date of Patent: Nov. 20, 2012

(54) DISPLAY SUBSTRATE AND DISPLAY PANEL HAVING THE SAME

(75) Inventors: Mee-Hye Jung, Suwon-si (KR);
Yong-Hwan Shin, Yongin-si (KR);
Kyoung-Tae Kim, Osan-si (KR);
Jae-Won Jeong, Seoul (KR); Jin-Soo Jung, Goyang-si (KR)

(73) Assignee: Samsung Display Co., Ltd., Yongin (KR)

( * ) Notice: Subject to any disclaimer, the term of this patent is extended or adjusted under 35 U.S.C. 154(b) by 446 days.

(21) Appl. No.: 12/621,386

(22) Filed: Nov. 18, 2009

(65) Prior Publication Data
US 2010/0123867 A1 May 20, 2010

(30) Foreign Application Priority Data
Nov. 20, 2008 (KR) .................. 10-2008-0115492

(51) Int. Cl.
*G02F 1/1337* (2006.01)
(52) U.S. Cl. ........................................ 349/129; 349/144
(58) Field of Classification Search ................ 349/129
See application file for complete search history.

(56) References Cited

U.S. PATENT DOCUMENTS

| 7,656,486 B2 * | 2/2010 | Tasaka et al. ............. 349/129 |
| 7,768,616 B2 * | 8/2010 | Huang et al. ............. 349/144 |
| 7,956,943 B2 * | 6/2011 | Lee et al. ............. 349/38 |

FOREIGN PATENT DOCUMENTS

| JP | 2004-029164 | 1/2004 |
| JP | 2006-317866 | 11/2006 |
| JP | 2007-004207 | 1/2007 |
| KR | 10-2007-0030867 | 3/2007 |

* cited by examiner

*Primary Examiner* — Richard Kim
(74) *Attorney, Agent, or Firm* — H.C. Park & Associates, PLC

(57) ABSTRACT

A display substrate includes a pixel electrode and a photo-alignment film. The pixel electrode is disposed on a base substrate. The pixel electrode includes a first sub-electrode, a second sub-electrode separated from the first sub-electrode, and a micro-slit pattern disposed on at least one of the first and second sub-electrodes. The photoalignment film is disposed on the pixel electrode to respectively divide the first and second sub-electrodes into a plurality of domains.

19 Claims, 11 Drawing Sheets

DISPLAY SUBSTRATE AND DISPLAY PANEL HAVING THE SAME

CROSS REFERENCE TO RELATED APPLICATION

This application claims priority from and the benefit of Korean Patent Application No. 2008-115492, filed on Nov. 20, 2008, which is hereby incorporated by reference for all purposes as if fully set forth herein.

BACKGROUND OF THE INVENTION

1. Field of the Invention

The present invention relates to a display substrate for a liquid crystal display (LCD) device, and a display panel having the display substrate.

2. Discussion of the Background

An LCD device typically uses optical anisotropy and light polarization to display an image. By driving a voltage applied to a liquid crystal layer including liquid crystal molecules that have long and thin molecular structures, the alignment of the liquid crystal is molecules in the liquid crystal layer may be changed and the light transmittance of the liquid crystal layer may be controlled. The LCD device displays an image by controlling the quantity of polarized light using optical anisotropy of the liquid crystal molecules.

A display panel of the LCD device is formed by interposing the liquid crystal layer between two substrates. In order to display an image on the display device, the alignment of liquid crystal molecules in the liquid crystal layer should be uniformly controlled. For example, in a vertical alignment (VA) mode for aligning the liquid crystal molecules, a vertical electric field is applied to the liquid crystal layer. In an in-plane switching (IPS) mode for aligning the liquid crystal molecules, a horizontal electric field is applied to the liquid crystal layer.

In the VA mode, a domain, in which the liquid crystal molecules are aligned, is divided into a plurality of regions to increase a viewing angle. The VA mode for increasing the viewing angle includes a patterned vertical alignment (PVA) mode for patterning a common electrode disposed on an upper substrate of the display panel. A multi-domain vertical alignment (MVA) mode for forming a protrusion on the upper substrate of the display panel has been developed. A photoalignment VA mode for defining multiple domains by controlling a pretilt angle on the photoalignment film has also been developed.

The photoalignment VA mode does not pattern a pixel electrode of a lower substrate and a common electrode of an upper substrate. Thus, light transmittance and aperture ratio in the photoalignment VA mode may be better than those in the PVA mode. The photoalignment VA mode may also have better display properties than the MVA mode having the protrusion on the upper substrate. However, a viewing angle of the photoalignment VA mode may be narrower than that of the IPS mode using the horizontal electric field.

SUMMARY OF THE INVENTION

The present invention provides a display substrate including a micro-slit pattern formed on a pixel electrode, so that a viewing angle of the display substrate may be improved without decreasing light transmittance thereof.

The present invention also provides a display panel having the display substrate.

Additional features of the invention will be set forth in the description which follows, and in part will be apparent from the description, or may be learned by practice of the invention.

The present invention discloses a display substrate that includes a pixel electrode and a photoalignment film. The pixel electrode is disposed on a base substrate. The pixel electrode includes a first sub-electrode and a second sub-electrode separated from the first sub-electrode. A micro-slit pattern is formed on at least one of the first sub-electrode and the second sub-electrode. The photoalignment film is disposed on the pixel electrode. The photoalignment film divides each area in which the first sub-electrode and the second sub-electrode are disposed into a plurality of domains.

The present invention also discloses a display panel. The display panel includes a display substrate and an opposite substrate. The display substrate is disposed on a base substrate. The display substrate includes a pixel electrode and a photoalignment film. The pixel electrode includes a first sub-electrode and a second sub-electrode separated from the first sub-electrode. A micro-slit pattern is formed on at least one of the first sub-electrode and the second sub-electrode. The photoalignment film is disposed on the pixel electrode. The photoalignment film divides each area in which the first sub-electrode and the second sub-electrode are disposed into a plurality of domains. The opposite substrate is coupled with the display substrate. The opposite substrate includes a common electrode facing the pixel electrode. A liquid crystal layer is disposed between the opposite substrate and the display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
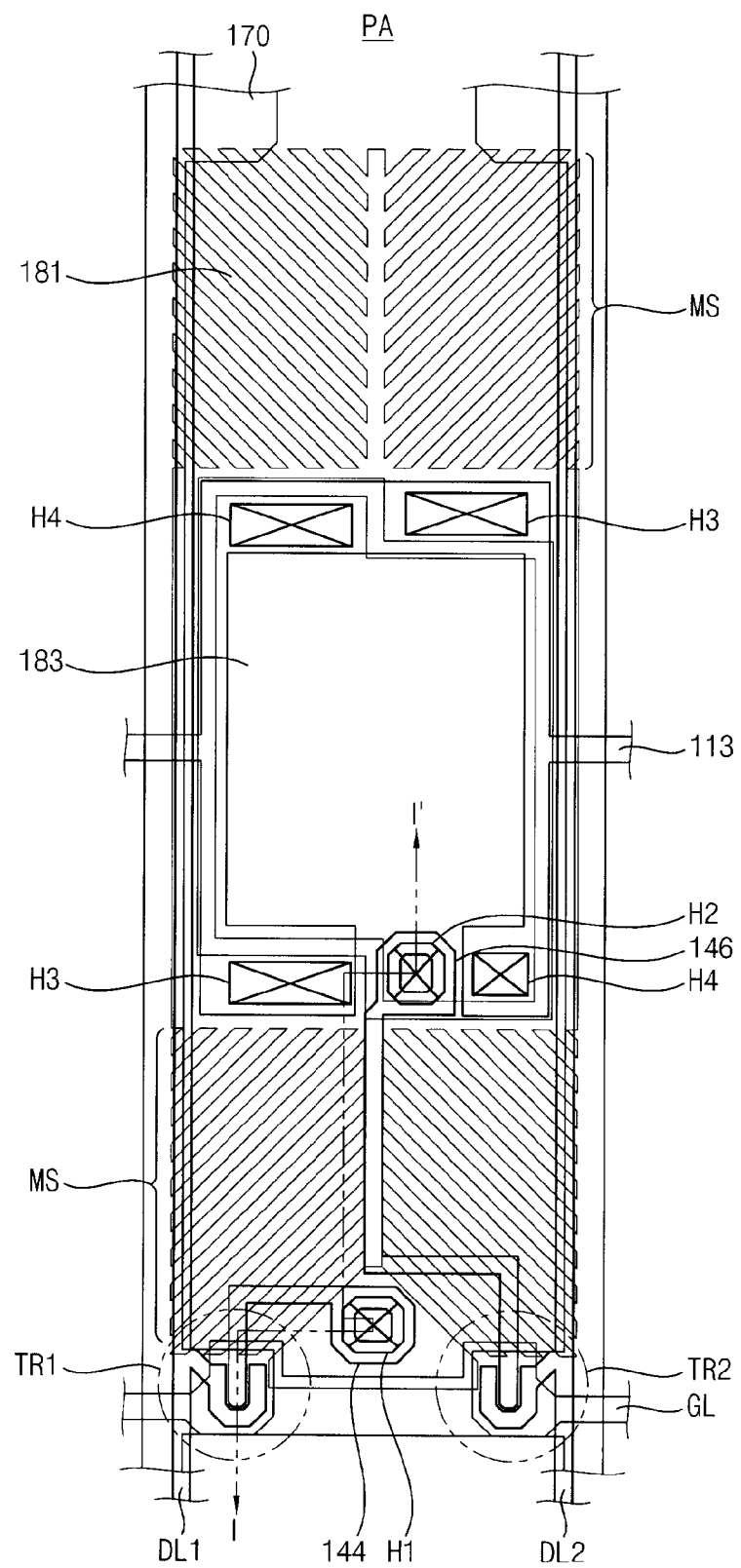
FIG. 1 is a plan view showing a display panel according to an exemplary embodiment of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set fourth herein. Rather, these exemplary embodiments are provided so that this disclosure will be through and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used is herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
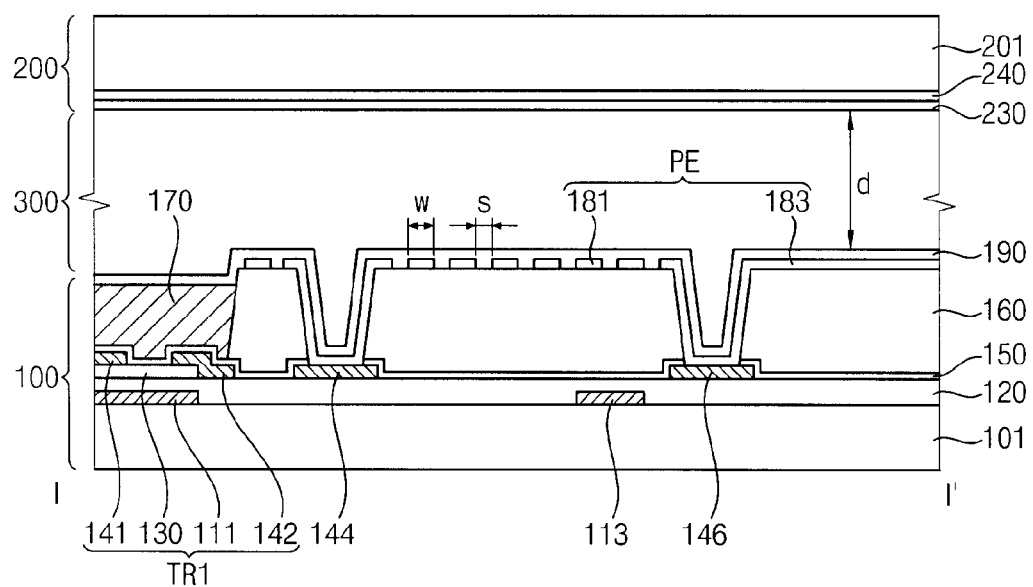
FIG. 2 is a cross-sectional view taken along line I-I' of FIG. 1.

FIG. 1 is a plan view showing a display panel according to an exemplary embodiment of the present invention. FIG. 2 is a cross-sectional view taken along line I-I' of FIG. 1.

Figure 3:
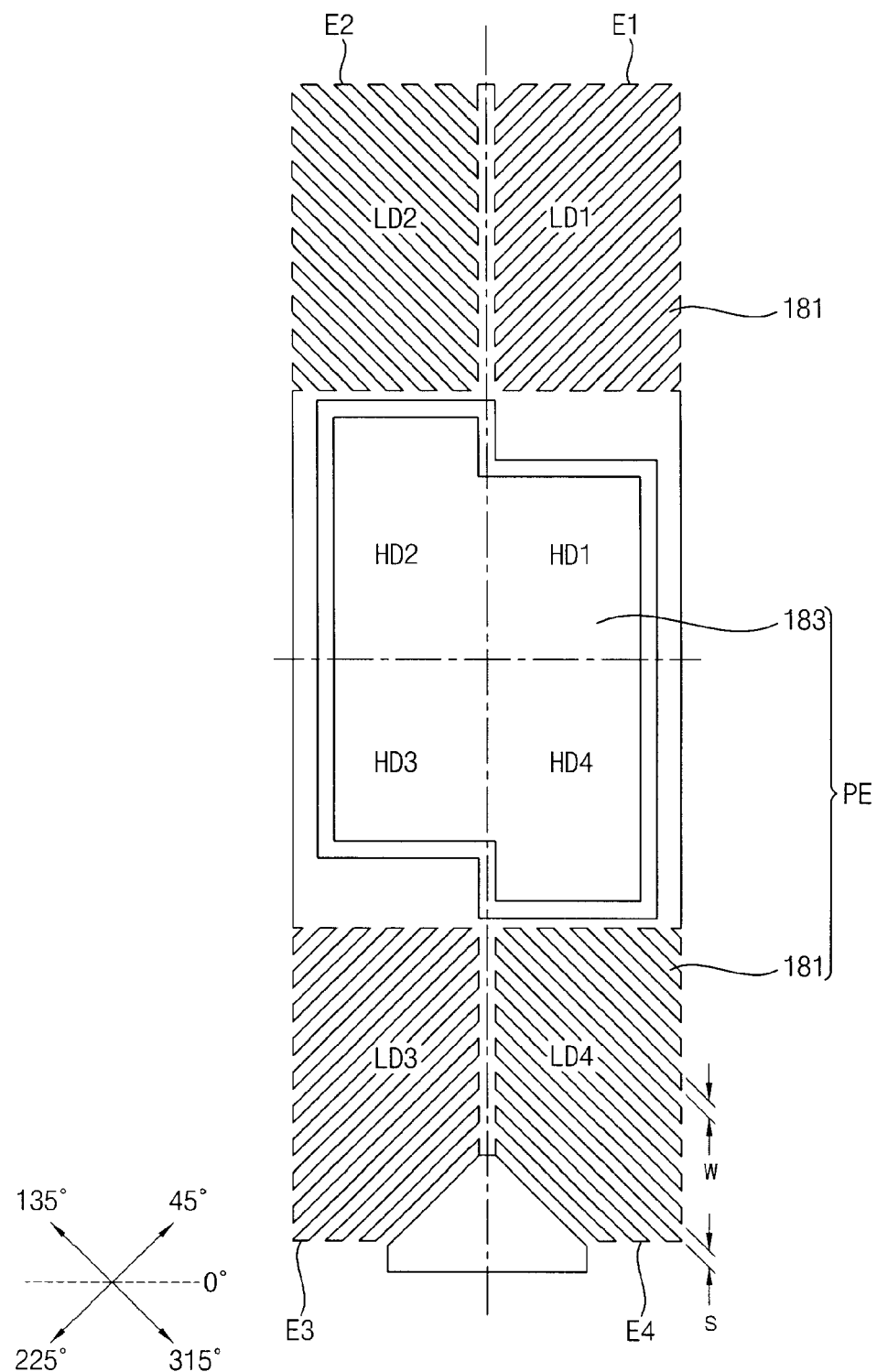
FIG. 3 is a plan view showing a pixel electrode of FIG. 1.

FIG. 3 is a plan view showing a pixel electrode of FIG. 1.

Referring to FIG. 1, FIG. 2, and FIG. 3, the display panel includes a display substrate 100, an opposite substrate 200 facing the display substrate 100 and combined with the display substrate 100, and a liquid crystal layer 300 disposed between the display substrate 100 and the opposite substrate 200.

The display substrate 100 includes a first base substrate 101 on which a plurality of pixel areas is defined. The display substrate 100 includes a first metal pattern including a gate line GL, a gate electrode 111, and a storage electrode 113, which are formed from a first metal layer. The gate line GL is extended in a first direction. The gate electrode 111 is extended from the gate line GL. The storage electrode 113 is disposed in each pixel area PA. The storage electrode 113 receives a common voltage.

The display substrate 100 includes a gate insulation layer 120 disposed on the first metal pattern. A channel pattern 130 is disposed on the gate insulation layer 120. The channel pattern 130 is disposed on the gate electrode 111 and includes a semiconductor layer doped with impurities and an ohmic contact layer disposed on the semiconductor layer.

The display substrate 100 includes a second metal pattern including a first data line DL1, a second data line DL2, a source electrode 141, a drain electrode 142, a first connecting electrode 144, and a second connecting electrode 146, which are formed from a second metal layer. The first and second data lines DL1 and DL2 are extended in a second direction crossing the first direction. The drain electrode 142 is separated from the source electrode 141 so that the channel pattern 130 is exposed. The first connecting electrode 144 is extended from the drain electrode 142 of a first transistor TR1 electrically connected to the first data line DL1. The second connecting electrode 146 is extended from a drain electrode of a second transistor TR2 electrically connected to the second data line DL2.

The display substrate 100 includes a protective layer 150 and a color filter layer 160, which are disposed on the second metal pattern. The protective layer 150 and the color filter layer 160 include a plurality of holes H1, H2, H3, and H4. A first hole H1 is disposed on the first connecting electrode 144 so that the first connecting electrode 144 is exposed. A second hole H2 is disposed on the second connecting electrode 146 so that the second connecting electrode 146 is exposed. Third and fourth holes H3 and H4 are disposed on the storage electrode 113 so that the protective layer 150 corresponding to the storage electrode 113 is exposed. The color filter layer 160 may optionally be formed as a transparent organic layer.

The display substrate 100 further includes a light-blocking pattern 170. The light-blocking pattern 170 corresponds to an area in which the first and second transistors TR1 and TR2, the first and second data lines DL1 and DL2 and the gate line GL are disposed. The light-blocking pattern 170 blocks light.

The display substrate 100 includes a pixel electrode PE in each pixel area. The pixel electrode PE includes a transparent conductive material. The pixel electrode PE includes a micro-slit pattern MS. The micro-slit pattern MS includes a plurality of micro-electrodes separated by a gap "s" of several micrometers (μm). Each micro-electrode has a width "w" of several micrometers (μm). For example, the gap s and the width w are shorter than 1/2.5 of the cell gap d. The gap s and the width w may be from about 3 μm to about 4 μm.

Referring to FIG. 3, the pixel electrode PE includes a first sub-electrode 181 disposed in a first sub-area and a second sub-electrode 183 disposed in a second sub-area and separated from the first sub-electrode 181. The first sub-electrode 181 is connected to the first connecting electrode 144 through the first hole H1. The second sub-electrode 183 is connected to the second connecting electrode 146 through the second hole H2. The first sub-electrode 181 is disposed on the protective layer 150 on the storage electrode 113 through the third hole H3 so that a first storage capacitor is defined. The second sub-electrode 183 is disposed on the protective layer 150 on the storage electrode 113 through the fourth hole H4, to define a second storage capacitor.

For example, the second sub-electrode 183 is disposed in the center of the pixel area PA. The first sub-electrode 181 is disposed at upper and lower portions of the second sub-electrode 183 and is electrically connected to the second sub-electrode 183. The first sub-electrode 181 includes the micro-slit pattern MS. The second sub-electrode 183 may include the micro-slit pattern MS, or both the first and second sub-electrodes 181 and 183 may include the micro-slit pattern MS.

Although not shown in figures, a capping layer capping the color filter layer 160 and the light-blocking pattern 170 may be formed under the pixel electrode PE. The capping layer prevents impurity ions generated from the color filter layer 160 and the light-blocking pattern 170 from flowing into the liquid crystal layer and out-gassing.

The display substrate 100 includes a first photoalignment film 190 disposed on the pixel electrode PE. The first photoalignment film 190 defines multiple domains of the pixel area PA. As shown in FIG. 3, the first photoalignment film 190 divides the first sub-area in which the first sub-electrode 181 is disposed into a plurality of domains LD1, LD2, LD3, and LD4. The first photoalignment film 190 divides the second sub-area in which the second sub-electrode 183 is disposed into a plurality of domains HD1, HD2, HD3, and HD4. The first photoalignment film 190 includes a photoreactor (not shown) that is photoaligned. The photoreactor has an inclination angle corresponding to an irradiation direction of ultraviolet (UV) light. Therefore, the multiple domains LD1, LD2, LD3, LD4, HD1, HD2, HD3, and HD4 may be formed by controlling the irradiation direction of UV light.

The micro-slit pattern MS includes a micro-electrode E extended along an inclination direction from a longitudinal axis of the pixel electrode PE. The inclination angles of is the micro-electrodes E in the domains LD1, LD2, LD3, LD4, HD1, HD2, HD3 and HD4 are different from each other.

As shown in FIG. 3, a first micro-electrode E1 disposed in a first domain LD1 of the first sub-electrode 181 has an inclination angle of 45 degrees from the longitudinal axis of the pixel electrode PE. A second micro-electrode E2 disposed in a second domain LD2 of the first sub-electrode 181 has an inclination angle of 135 degrees from the longitudinal axis of the pixel electrode PE. A third micro-electrode E3 disposed in a third domain LD3 of the first sub-electrode 181 has an inclination angle of 225 degrees from the longitudinal axis of the pixel electrode PE. A fourth micro-electrode E4 disposed in a fourth domain LD4 of the first sub-electrode 181 has an inclination angle of 315 degrees from the longitudinal axis of the pixel electrode PE. The inclination angles of the micro-electrodes disposed in domains adjacent to each other are substantially orthogonal. The inclination angles of the micro-electrodes disposed in domains opposite to each other are substantially parallel.

Therefore, the pixel area PA in which the pixel electrode PE is disposed is divided into two domains by a received voltage difference. The pixel area PA is divided into 8 domains based on the received voltage difference and the inclination angle difference of the first photoalignment film 190.

The opposite substrate 200 includes a second base substrate 201 on which a plurality of pixel areas is defined. The opposite substrate 200 includes a common electrode 230 and a photoalignment film 240. The common electrode 230 is disposed on the second base substrate 201. The common electrode 230 faces the pixel electrode PE. The second photoalignment film 240 includes the same material as the first photoalignment film 190. The second photoalignment film 240 defines multiple domains using the same method as the first photoalignment film 190.

The liquid crystal layer 300 is divided into multiple domains LD1, LD2, LD3, LD4, HD1, HD2, HD3, and HD4 by the first photoalignment film 190 of the display substrate 100 and the second photoalignment film 240 of the opposite substrate 200. An array of the liquid crystal layer 300 is controlled by an electric field formed by the pixel electrode PE and the common electrode 230. The controlled liquid crystal layer 300 is used for displaying an image having a gray scale according to a transmitted amount of light. The liquid crystal layer 300 includes liquid crystal molecules of a vertical alignment (VA) mode.

The first sub-electrode 181 on which the micro-slit pattern MS is formed and the second sub-electrode 183 formed as a whole plate have different electric fields so that alignment angles of liquid crystal molecules in the liquid crystal layer 300 may be different. Accordingly, side visibility of the display panel may be improved. In addition, an area in which the first micro-electrode E1 of the first sub-electrode 181 is formed and an area in which the first micro-electrode E1 is not formed have different electric fields so that alignment angles of liquid crystal molecules in the liquid crystal layer 300 may be different. Accordingly, the side visibility of the display panel may be improved.

When the electric field is strong, liquid crystal molecules in the liquid crystal layer 300 lie down horizontally in an extending direction of the micro-electrodes E1, E2, E3, and E4 so that light transmittance may not be decreased.

Figure 4A:
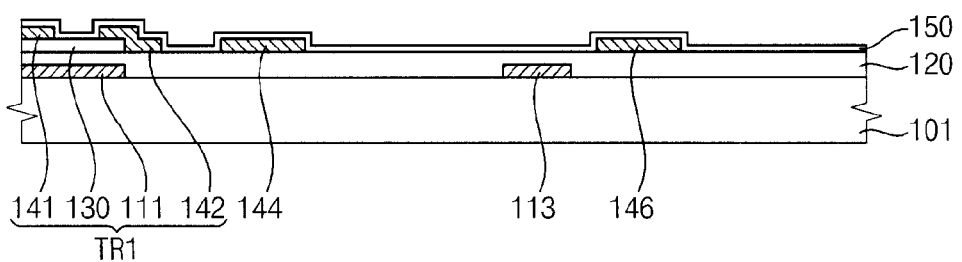
FIG. 4A, FIG. 4B, and FIG. 4C are cross-sectional views showing a method of manufacturing the display substrate of FIG. 2.
Figure 4B:
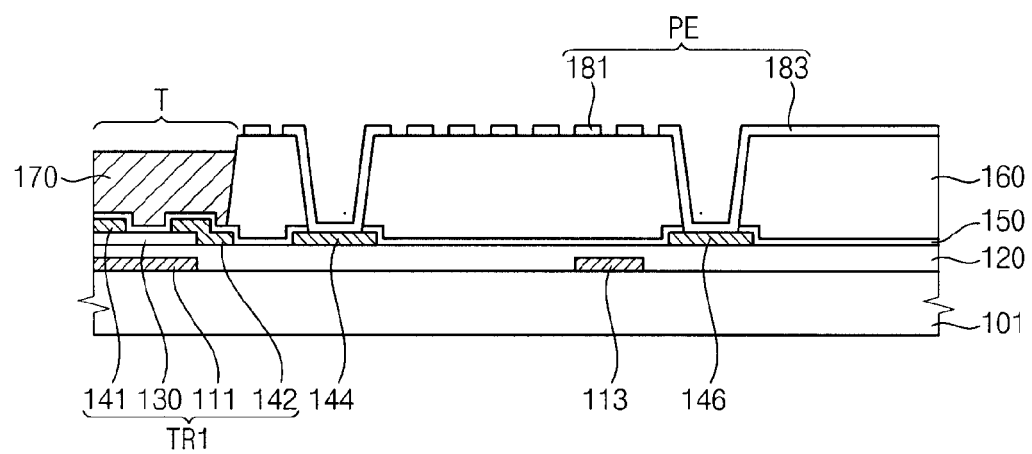
Figure 4C:
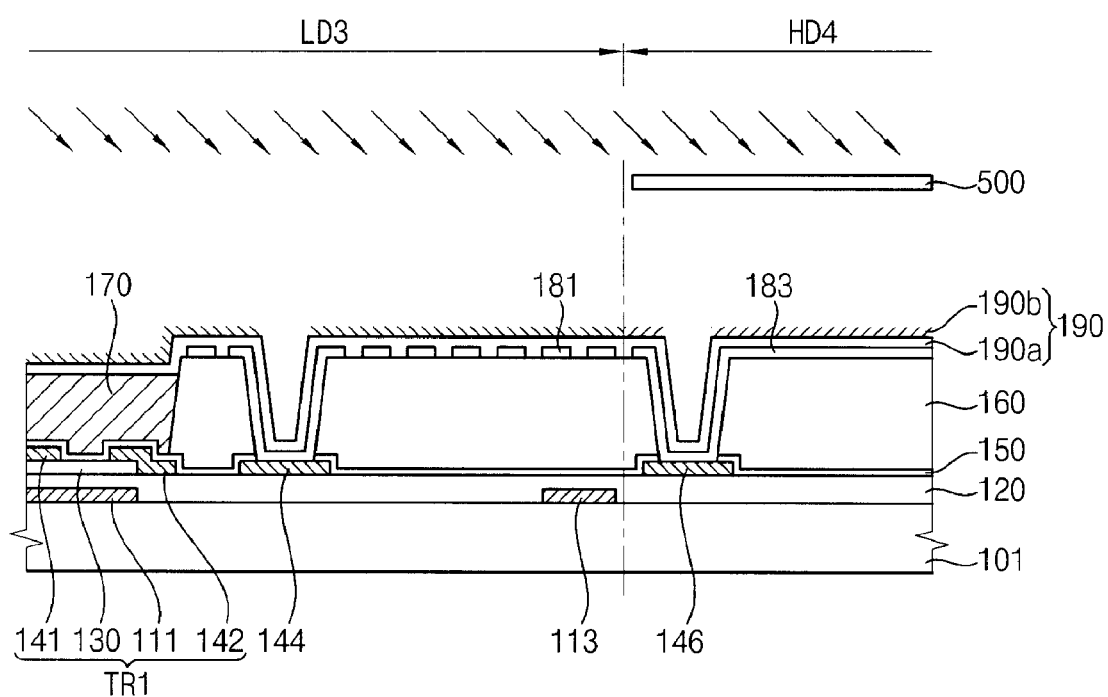

FIG. 4A, FIG. 4B, and FIG. 4C are cross-sectional views showing a method of manufacturing the display substrate of FIG. 2.

Referring to FIG. 2 and FIG. 4A, a first metal layer is formed on a base substrate 101. A first metal pattern is formed by patterning the first metal layer. The first metal pattern is includes the gate line GL, the gate electrode 111, and the storage electrode 113. A gate insulation layer 120 is formed on the base substrate 101 on which the first metal pattern is formed.

A channel layer 130 is formed on the base substrate 101 on which the gate insulation layer 120 is formed. A second metal layer is formed on the base substrate 101 on which the channel layer 130 is formed. A second metal pattern is formed by patterning the second metal layer. The second metal pattern includes the first data line DL1, the second data line DL2, the source electrode 141, the drain electrode 142, and the first and second connecting electrodes 144 and 146.

Although not shown in figures, a channel layer and a second metal layer may be formed sequentially on the base substrate 101 on which the gate insulation layer 120 is formed. The second metal pattern may be formed by patterning the channel layer and the second metal layer simultaneously using one mask. In this case, the second metal pattern, which includes the first and second data lines DL1 and DL2, the source electrode 141, the drain electrode 142, and the first and second connecting electrodes 144 and 146, includes the channel layer and the second metal layer.

A protective layer 150 is formed on the base substrate 101 on which the second metal pattern is formed. Therefore, a transistor layer TL (not shown) is formed on the base substrate 101. The transistor layer TL includes first and second transistors connected to the gate line GL, the first data line DL1, and the second data line DL2.

Referring to FIG. 2 and FIG. 4B, the color filter layer 160 and the light-blocking pattern 170 is formed on the base substrate 101 on which the transistor layer TL is formed. For example, the color filter layer 160 including the first, second, third, and fourth holes H1, H2, H3, and H4 is formed. On the color filter layer 160, a trench T corresponds to an area in which the first and second transistors TR1 and TR2 are formed.

Then, a light-blocking layer is formed on the base substrate 101 in which the color filter layer 160 is formed. A light-blocking pattern 170 is formed in the trench T by patterning the light-blocking layer. The present exemplary embodiment shows forming the color filter layer 160 first and then forming the light-blocking pattern 170. Alternatively, the light-blocking pattern 170 may be formed first and then the color filter layer 160 may be formed.

Although not shown in figures, a capping layer capping the color filter layer 160 and the light-blocking pattern 170 may be formed on the base substrate 101 on which the color filter layer 160 and the light-blocking pattern 170 are formed.

A transparent conductive layer is formed on the base substrate 101. The transparent conductive layer is connected to the first and second connecting electrodes 144 and 146 through the first and second holes H1 and H2. The transparent conductive layer is disposed on the storage electrode 113 and the protective layer 150 through the third and fourth holes H3 and H4. The pixel electrode PE is formed in the pixel area PA by patterning the transparent conductive layer. The pixel electrode PE includes a first sub-electrode 181 including the micro-slit pattern MS and a second sub-electrode 183 separated from the first sub-electrode 181. The first sub-electrode 181 is formed in a first sub-area. The second sub-electrode 183 is formed in a second sub-area.

Referring to FIG. 2 and FIG. 4C, a photoalignment layer 190a is formed on the base substrate 101 on which the pixel electrode PE is formed. The photoalignment layer 190a includes a polymer material. For example, the photoalignment layer 190a may include polyimide, polyamic acid, polynorbornene, phenylmaleimide copolymer, polyvinylcinnamate, polyazobenzene, polyethyleneimine, polyvinyl alcohol, polyamide, polyethylene, polystyrene, polyphenylene phthalamide, polyester, polyurethane, polymethyl methacrylate, etc.

A mask 500 is disposed on the photoalignment layer 190a. A photoreactor 190b is formed on the photoalignment layer 190a by irradiating UV light. The photoreactor 190b has an inclination angle corresponding to an irradiation direction of the UV light. For example, in order to divide the photoalignment layer 190a on the pixel electrode PE into multiple domains LD1, LD2, LD3, LD4, HD1, HD2, HD3, and HD4, the photoreactor 190b is formed to have a different inclination angle for each domain by irradiating UV light that is polarized in a different direction.

For example, a mask 500 covers a pixel area of the first sub-electrode 181 except a third domain LD3. A photoreactor 190b is formed on the third domain LD3 by irradiating polarized UV light. In the same way, the photoreactor 190b having a different inclination angle for each domain is formed. The first photoalignment film 190 having multiple domains is thereby formed on the pixel electrode PE.

Figure 5:
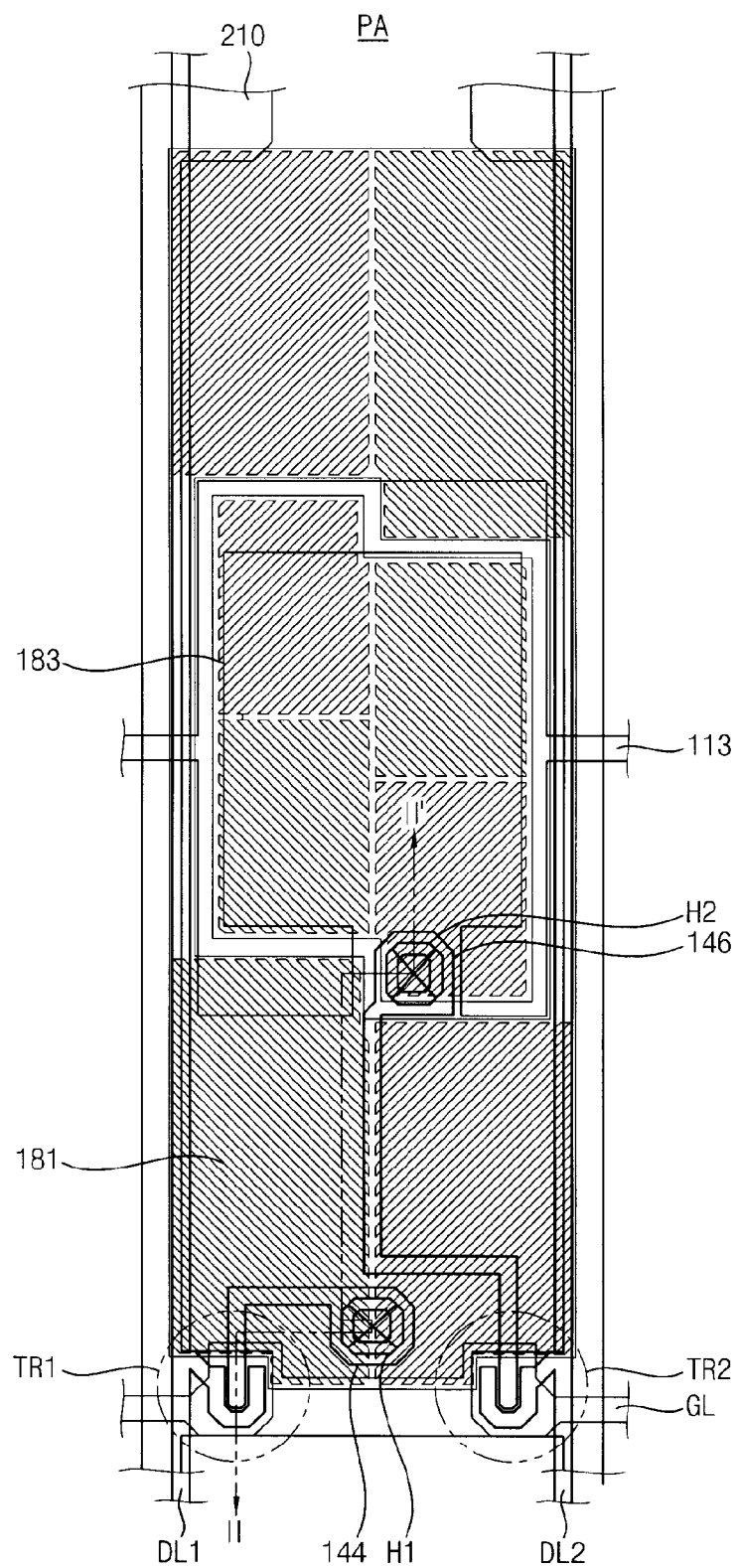
FIG. 5 is a plan view showing a display panel according to an exemplary embodiment of the present invention.
Figure 6:
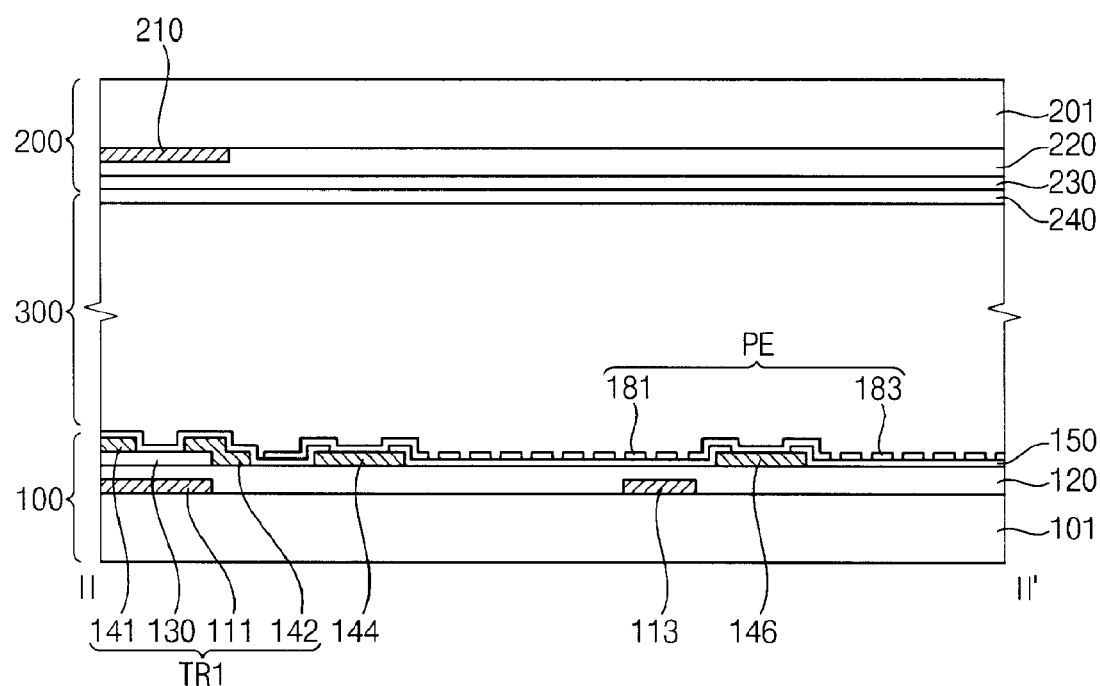
FIG. 6 is a cross-sectional view taken along line II-II' of FIG. 5.
Figure 7:
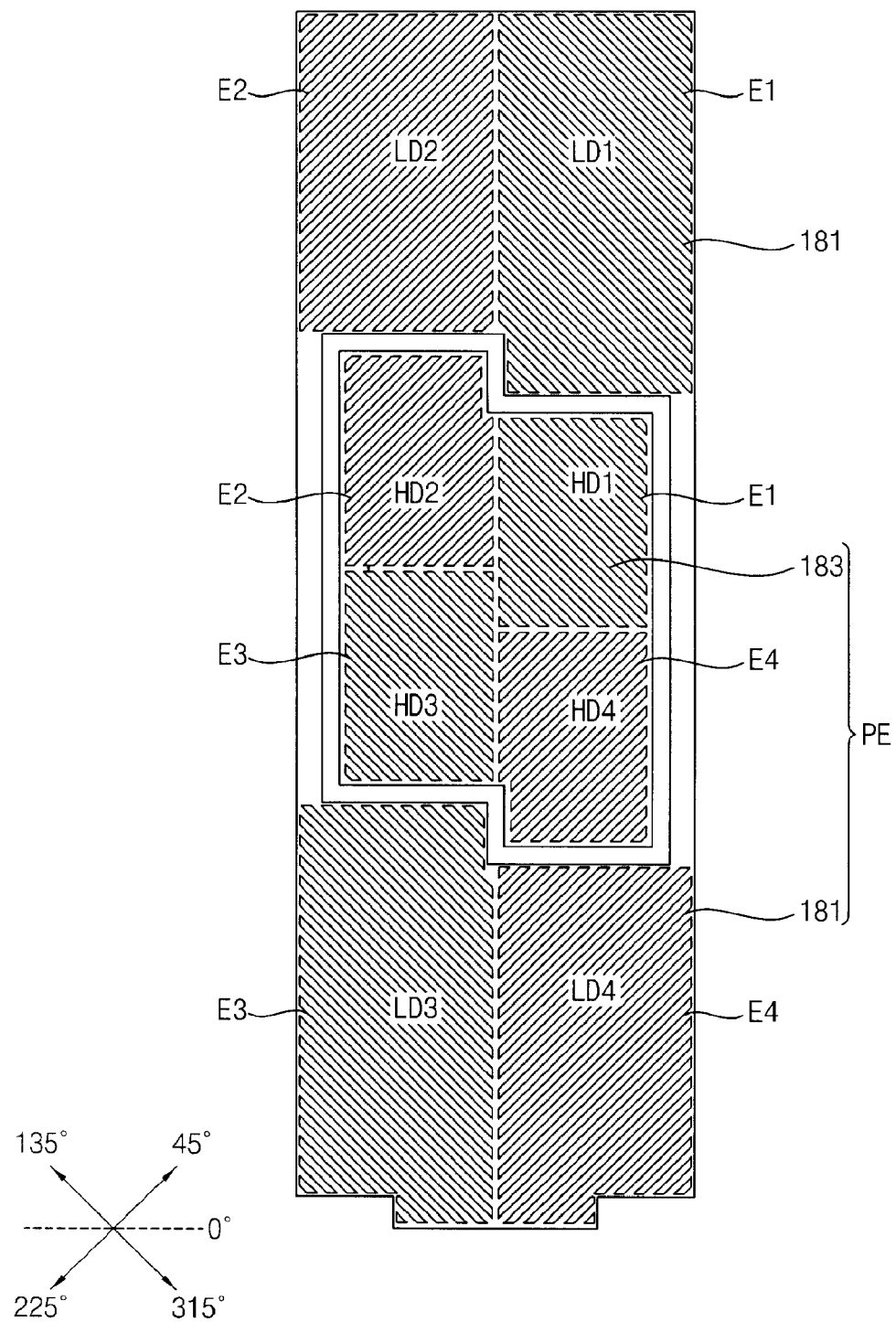
FIG. 7 is a plan view showing a pixel electrode of FIG. 5.

FIG. 5 is a plan view showing a display panel according to an exemplary embodiment of the present invention. FIG. 6 is a cross-sectional view taken along line II-IF of FIG. 5. FIG. 7 is a plan view showing a pixel electrode of FIG. 5. Hereinafter, any repetitive explanations concerning the same elements using the same reference numbers or letters may be omitted.

Referring to FIG. 5, FIG. 6, and FIG. 7, the display panel includes a display substrate 100, an opposite substrate 200, and a liquid crystal layer 300.

The display substrate 100 includes a first base substrate 101, a gate line GL, a gate electrode 111, a storage electrode 113, a gate insulation layer 120, a channel pattern 130, a first data line DL1, a second data line DL2, a source electrode 141, a drain electrode 142, first and second connecting electrodes 144 and 146, a protective layer 150, a pixel electrode PE, and a first photoalignment film 190. The opposite substrate 200 includes a second base substrate 201, a light-blocking pattern 210, a color filter layer 220, a common electrode 230, and a second photoalignment film 240.

Compared to the display panel of the exemplary embodiment shown in FIG. 2, the opposite substrate 200 of the display panel of the present exemplary embodiment includes the light-blocking pattern 210 and the color filter layer 220, rather than the display substrate 100.

Referring to FIG. 7, the pixel electrode PE includes a first sub-electrode 181 disposed in a first sub-area and a second sub-electrode 183 separated from the first sub-electrode. A micro-slit pattern MS is formed on substantially the entire surface of the first and second sub-electrodes 181 and 183.

The first sub-electrode 181 is connected to the first connecting electrode 144 through the first contact hole H1. The second sub-electrode 183 is connected to the second connecting electrode 146 through the second hole H2. The first sub-electrode 181 is disposed on the protective layer 150 on the storage electrode 113 through the third hole H3 so that a first storage capacitor is defined. The second sub-electrode 183 is disposed on the protective layer 150 on the storage electrode 113 through the fourth hole H4 so that a second storage capacitor is defined.

The display substrate 100 includes a first photoalignment film 190 disposed on the pixel electrode PE. The first photoalignment film 190 defines multiple domains of the pixel area PA. As shown in FIG. 7, the first photoalignment film 190 divides the first sub-area in which the first sub-electrode 181 is disposed into a plurality of domains LD1, LD2, LD3, and LD4. The first photoalignment film 190 divides the second sub-area in which the second sub-electrode 183 is disposed into a plurality of domains HD1, HD2, HD3, and HD4. The first photoalignment film 190 includes a photoreactor. The photoreactor has a different inclination angle for each domain of the multiple domains.

The micro-slit pattern MS includes a micro-electrode E extended along an inclination direction from a longitudinal axis of the pixel electrode PE. The inclination angles of the micro-electrodes E in the domains LD1, LD2, LD3, LD4, HD1, HD2, HD3, and HD4 are different from each other.

For example, as shown in FIG. 7, a first micro-electrode E1 disposed in a first domain LD1 of the first sub-electrode 181 has an inclination angle of 315 degrees from the longitudinal axis of the pixel electrode PE. A second micro-electrode E2 disposed in a second domain LD2 of the first sub-electrode 181 has an inclination angle of 225 degrees from the longitudinal axis of the pixel electrode PE. A third micro-electrode E3 disposed in a third domain LD3 of the first sub-electrode 181 has an inclination angle of 135 degrees from the longitudinal axis of the pixel electrode PE. A fourth micro-electrode E4 disposed in a fourth domain LD4 of the first sub-electrode 181 has an inclination angle of 45 degrees from the longitudinal axis of the pixel electrode PE. A first micro-electrode E1 disposed in a first domain HD1 of the second sub-electrode 183 has an inclination angle of 315 degrees from the longitudinal axis of the pixel electrode PE. A second micro-electrode E2 disposed in a second domain HD2 of the second sub-electrode 183 has an inclination angle of 225 degrees from the longitudinal axis of the pixel electrode PE. A third micro-electrode E3 disposed in a third domain HD3 of the second sub-electrode 183 has an inclination angle of 135 degrees from the longitudinal axis of the pixel electrode PE. A fourth micro-electrode E4 disposed in a fourth domain HD4 of the second sub-electrode 183 has an inclination angle of 45 degrees from the longitudinal axis of the pixel electrode PE.

The inclination angles of the domains adjacent to each other are substantially orthogonal. The micro-electrodes disposed in the domains opposite to each other are substantially parallel. The inclination angles of the micro-electrodes E disposed on the each plurality of domains make a quadrangle.

The first and second sub-areas have different electric fields because of a voltage difference of the first and second sub-electrodes 181 and 183 so that alignment angles of liquid crystal molecules in the liquid crystal layer 300 may be different. Accordingly, side visibility of the display panel may be improved.

The first sub-electrode 181 on which the micro-slit pattern MS is formed and the second sub-electrode 183 formed as a whole plate have different electric fields so that alignment angles of liquid crystal molecules in the liquid crystal layer 300 may be different. Accordingly, the side visibility of the display panel may be improved. In addition, in each sub-area, an area on which the first micro-electrode E1 is formed and an area on which the first micro-electrode E1 is not formed have different electric fields so that alignment angles of liquid crystal molecules in the liquid crystal layer 300 may be different. Accordingly, the side visibility of the display panel may be improved.

When the electric field is strong, liquid crystal molecules in the liquid crystal layer 300 lie down horizontally in an extending direction of the micro-electrodes E1, E2, E3, and E4 so that light transmittance may not be decreased.

A method of manufacturing a display substrate 100 is described with reference to FIG. 6, FIG. 4A, FIG. 4B, and FIG. 4C.

Referring to FIG. 6 and FIG. 4A, a first metal pattern including the gate line GL, the gate electrode 111, and storage electrode 113 is formed on the base substrate 101. The gate insulation layer 120 is formed on the base substrate 101 on which the first metal pattern is formed. A channel pattern 130 is formed on the base substrate 101 on which the gate insulation layer 120 is formed. A second metal pattern, including the first and second data lines DL1 and DL2, the source electrode 141, the drain electrode 142, and the first and second connecting electrodes 144 and 146, is formed on the base substrate 101 on which the channel pattern 130 is formed. A protective layer 150 is formed on the base substrate 101 on which the second metal pattern is formed. A transistor layer TL (not shown) is thereby formed on the base substrate 101. The transistor layer TL includes first and second transistors connected to the gate line GL, the first data line DL1 and the second data line DL2.

Although not shown in figures, a channel layer and a second metal layer may be formed sequentially on the base substrate 101 on which the gate insulation layer 120 is formed. The second metal pattern may be formed by patterning the channel layer and the second metal layer simultaneously using one mask.

Referring to FIG. 6, FIG. 4B, and FIG. 4C, the protective layer 150 includes holes H1 and H2 to expose the first and second connecting electrodes 144 and 146. The transparent conductive layer is formed on the base substrate 101. The transparent conductive layer is connected to the first and second connecting electrodes 144 and 146 through the holes H1 and H2. The pixel electrode PE is formed in the pixel area PA by patterning the transparent conductive layer. The pixel electrode PE includes a first sub-electrode 181 including the micro-slit pattern MS and a second sub-electrode 183 separated from the first sub-electrode 181 and including the micro-slit pattern MS. The first sub-electrode 181 is formed in a first sub-area. The second sub-electrode 183 is formed in a second sub-area.

A photoalignment layer 190a is formed on the base substrate 101 on which the pixel electrode PE is formed. A mask 500 is disposed on the photoalignment layer 190a. A photoreactor 190b is formed on the photoalignment layer 190a by irradiating UV light. The photoreactor 190b has an inclination angle corresponding to an irradiation direction of the UV light. The photoreactor has a different inclination angle for each domain of the multiple domains LD1, LD2, LD3, LD4, HD1, HD2, HD3, and HD4.

Figure 8:
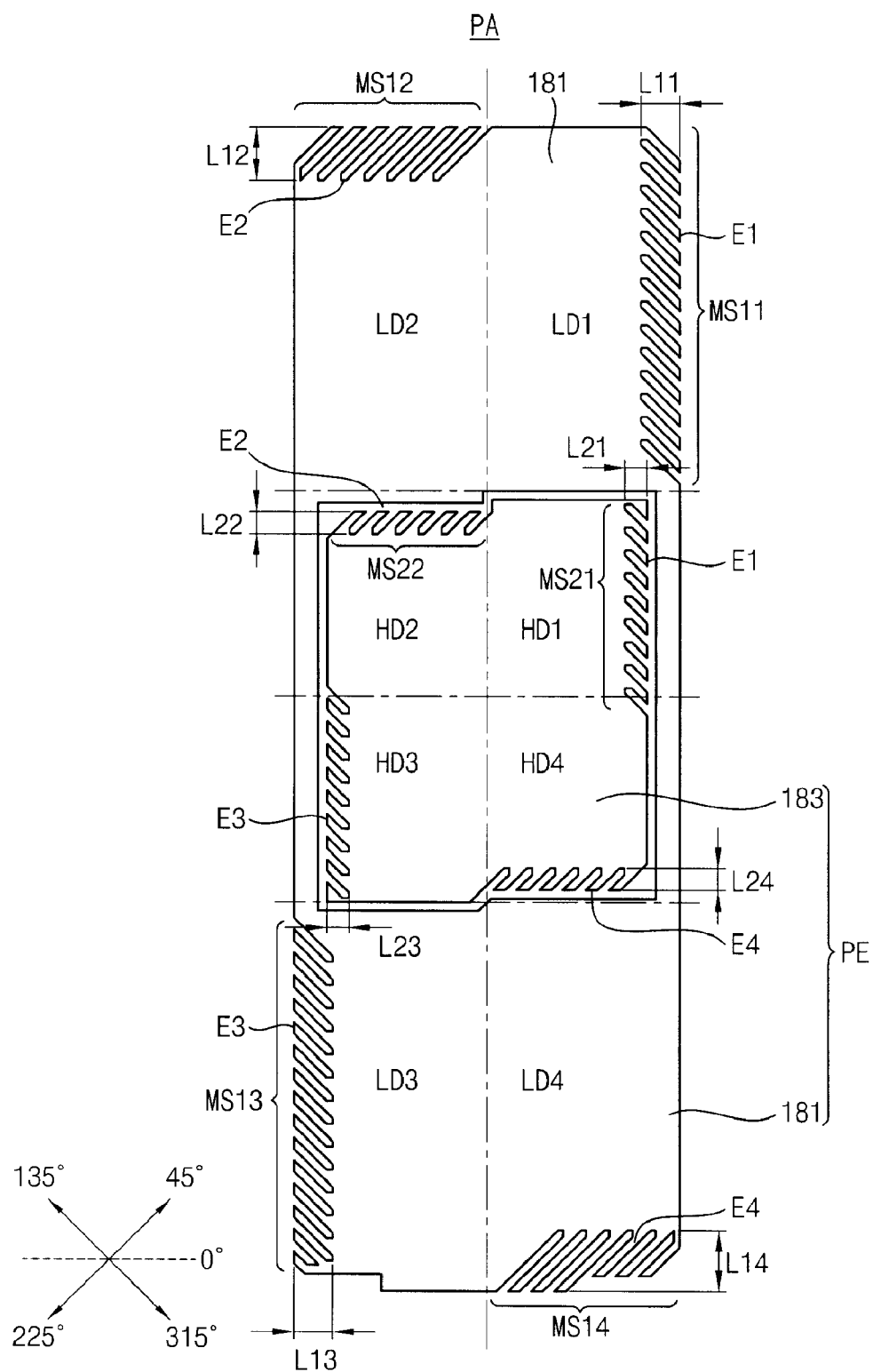
FIG. 8 is a plan view showing a pixel electrode according to an exemplary is embodiment of the present invention.

FIG. 8 is a plan view showing a pixel electrode according to an exemplary embodiment of the present invention.

Referring to FIG. 2 and FIG. 8, the pixel electrode PE includes a first sub-electrode 181 disposed on the first sub-area of the pixel area PA and a second sub-electrode 183 disposed on the second sub-area of the pixel area PA. The first photoalignment film 190 is disposed on the pixel electrode PE. The first photoalignment film 190 defines multiple domains of the pixel area PA. The pixel electrode PE includes a micro-slit pattern MS partially formed corresponding to a direction of liquid crystal molecules starting to lie down from a received voltage. The micro-slit pattern MS may be formed from an edge of the pixel electrode PE toward the inside of the pixel electrode PE. The length of the micro-slit pattern may be from about 6 μm to about 25 μm.

For example, according to the present exemplary embodiment, a first sub-area in which the first sub-electrode 181 is formed is divided into a plurality of domains LD1, LD2, LD3, and LD4. A second sub-area in which the second sub-electrode 183 is formed is divided into a plurality of domains HD1, HD2, HD3, and HD4.

A first micro-slit pattern MS11 including a first micro-electrode E1 is formed from an edge corresponding to a side portion of the first domain LD1 of the first sub-electrode 181. A second micro-slit pattern MS12 including a second micro-electrode E2 is formed from an edge corresponding to an upper portion of the second domain LD2 of the first sub-electrode 181. A third micro-slit pattern MS13 including a third micro-electrode E3 is formed from an edge corresponding to a side portion of the third domain LD3 of the first sub-electrode 181. A fourth micro-slit pattern MS14 including a fourth micro-electrode E4 is formed from an edge corresponding to a lower portion of the first domain LD4 of the first sub-electrode 181.

The first micro-slit pattern MS11 is formed from a first side edge. The length of the first micro-slit pattern MS11 is a first length L11. The second micro-slit pattern MS12 is formed from an upper edge. The length of the second micro-slit pattern MS12 is a second length L12. The third micro-slit pattern MS 13 is formed from a second side edge. The length of the third micro-slit pattern MS13 is a third length L13. The fourth micro-slit pattern MS14 is formed from a lower edge. The length of the fourth micro-slit pattern MS 14 is a fourth length L14. The first length L11 is about 18.75 µm. The second length L12 is about 12 µm. The third length L13 is about 15.25 µm. The fourth length L14 is about from 18.25 µm to about 23 µm.

A first micro-slit pattern MS21 including a first micro-electrode E1 is formed from an edge corresponding to a side portion of the first domain HD1 of the second sub-electrode 183. A second micro-slit pattern MS22 including a second micro-electrode E2 is formed from an edge corresponding to an upper portion of the second domain HD2 of the second sub-electrode 183. A third micro-slit pattern MS23 including a third micro-electrode E3 is formed from an edge corresponding to a side portion of the third domain HD3 of the second sub-electrode 183. A fourth micro-slit pattern MS24 including a fourth micro-electrode E4 is formed from an edge corresponding to a lower portion of the first domain HD4 of the second sub-electrode 183.

The first micro-slit pattern MS21 is formed from a first side edge. The length of the first micro-slit pattern MS21 is a first length L21. The second micro-slit pattern MS22 is formed from an upper edge. The length of the second micro-slit pattern MS22 is a second length L22. The third micro-slit pattern MS23 is formed from a second side edge. The length of the third micro-slit pattern MS23 is a third length L23. The fourth micro-slit pattern MS24 is formed from a lower edge. The length of the fourth micro-slit pattern MS24 is a fourth length L24. The first length L21 is about 9 µm. The second length L22 is about 8.5 µm. The third length L23 is about 8 µm. The fourth length L24 is about 9 µm.

For example, referring to FIG. 2, the gap s and the width w are shorter than 1/2.5 of the cell gap d. Preferably, the gap s and the width w are from about 3 µm to about 4 µm. The micro-slit pattern MS may be formed from an edge of the pixel electrode PE toward the inside of the pixel electrode PE. The length of the micro-slit pattern may be from about 6 µm to about 25 µm.

Forming the micro-slit pattern partially from edges of both the first and second sub-electrodes 181 and 183 is described above. Alternatively, the micro-slit pattern may be formed partially from edges of one of the first and second sub-electrodes 181 and 183.

The first and second sub-areas have different electric fields because of a voltage difference of the first and second sub-electrodes 181 and 183 so that alignment angles of liquid crystal molecules of the liquid crystal layer 300 may be different. Accordingly, side visibility of the display panel may be improved. In addition, in each sub-area, an area on which the first micro-electrode E1 is formed and an area on which the first micro-electrode E1 is not formed have different electric fields so that alignment angles of liquid crystal molecules of the liquid crystal layer 300 may be different. Accordingly, the side visibility of the display panel may be improved.

The micro-slit pattern MS is formed partially from edges of the pixel electrode PE so that light transmittance in the display panel according to the exemplary embodiment shown in FIG. 8 may be improved compared to the exemplary embodiments shown in FIG. 1 and FIG. 5.

A display panel including the pixel electrode PE of the present exemplary embodiment may include substantially the same elements as the display panel according to the exemplary embodiment shown in FIG. 2 or the display panel according to the exemplary embodiment shown in FIG. 6, when the pixel electrode PE shown in FIG. 8 is applied to the display panel shown in those exemplary embodiments. A method of manufacturing a display substrate 100 applying the pixel electrode PE of the present exemplary embodiment may be substantially the same as a method of manufacturing a display substrate applying the pixel electrode of the other exemplary embodiments described above. For this reason, any repetitive explanations may be omitted.

Figure 9:
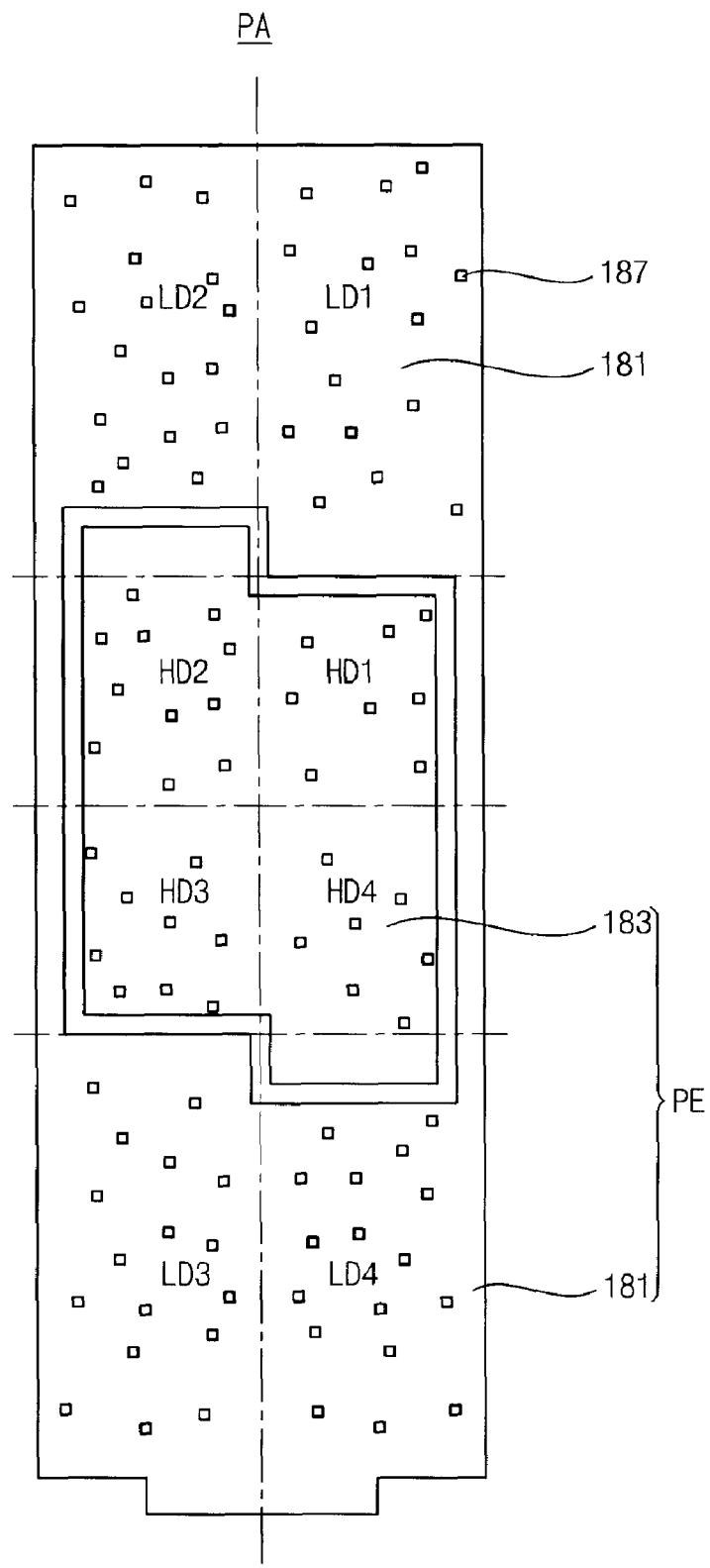
FIG. 9 is a plan view showing a pixel electrode according to an exemplary embodiment of the present invention.

FIG. 9 is a plan view showing a pixel electrode according to an exemplary embodiment of the present invention.

Referring to FIG. 2 and FIG. 9, the pixel electrode PE includes a first sub-electrode 181 disposed in a first sub-area of a pixel area PA and a second sub-electrode 183 disposed in a second sub-area of a pixel area PA. A first photoalignment film 190 is disposed on the pixel electrode PE. The first photoalignment film 190 defines multiple domains of the pixel area PA. For example, the first photoalignment film 190 divides the first sub-area in which the first sub-electrode 181 is disposed into a plurality of domains LD1, LD2, LD3, and LD4. The first photoalignment film 190 divides the second sub-area in which the second sub-electrode 183 is disposed into a plurality of domains HD1, HD2, HD3, and HD4.

A plurality of hole patterns 187 is formed on the first and second sub-electrodes 181 and 183. The hole patterns are disposed randomly. The size of each hole pattern is several micrometers. For example, the size of each hole pattern is about 3 µm by about 3 µm.

The first and second sub-areas have different electric fields because of a voltage difference of the first and second sub-electrodes 181 and 183, so that alignment angles of the liquid crystal molecules in the liquid crystal layer 300 are different. Accordingly, side visibility of the display panel may be improved. In addition, in each sub-area, an area on which the hole patterns are formed and an area on which the hole patterns are not formed have different electric fields so that alignment angles of liquid crystal molecules in the liquid crystal layer 300 are different. Accordingly, the side visibility of the display panel may be improved.

The micro-hole pattern 187 is formed on the pixel electrode PE so that light transmittance may be improved compared to the exemplary embodiments shown in FIG. 1 and FIG. 5.

A display panel including the pixel electrode PE of the present exemplary embodiment may include substantially the same elements as a display panel of the exemplary embodiment shown in FIG. 2 or a display panel of the exemplary embodiment shown in FIG. 6, when the pixel electrode PE shown in FIG. 9 is applied to the display panel of those exemplary embodiments. A method of manufacturing a display substrate 100 applying the pixel electrode PE of the present exemplary embodiment may be substantially the same as a method of manufacturing a display substrate applying the pixel electrode of the exemplary embodiments shown in FIG. 1 or FIG. 5. For this reason, any repetitive explanations may be omitted.

Figure 10A:
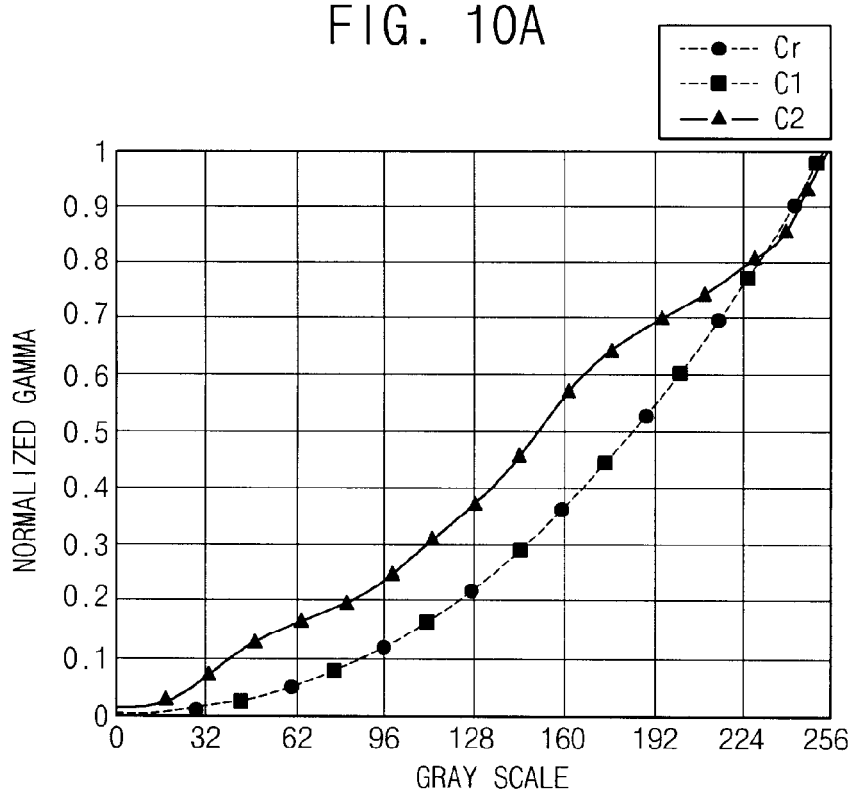
FIG. 10A and FIG. 10B are graphs showing a normalized gamma value according to a gray scale of an image displayed on the display panel according to an exemplary embodiment of the present invention.
Figure 10B:
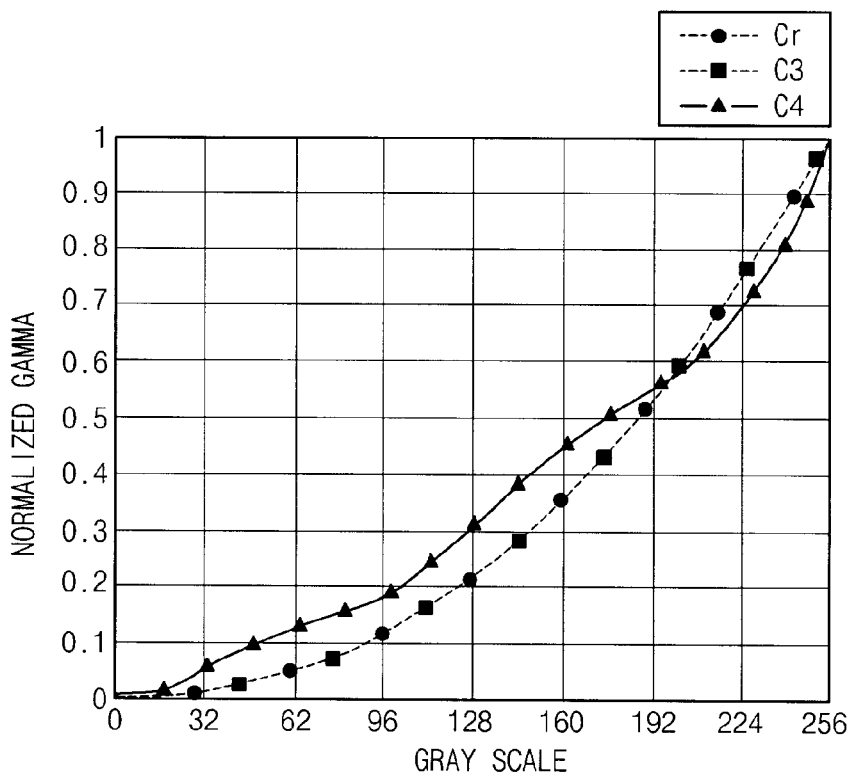

FIG. 10A and FIG. 10B are graphs showing a normalized gamma value according to a gray scale of an image displayed on the display panel according to an exemplary embodiment of the present invention.

FIG. 10A are graphs showing a front view gamma value C1 and a side view gamma value C2 according to the gray scale when a micro-slit pattern MS is partially (16%) formed on a pixel electrode PE. The front view gamma value C1 is almost the same as a target gamma value Cr. The side view gamma value C2 is different from the target gamma value Cr in the middle gray scale.

FIG. 10B are graphs showing a front view gamma value C3 and a side view gamma value C4 according to the gray scale when a micro-slit pattern MS is formed on substantially the entire surface of the pixel electrode PE. The front gamma value C3 is almost the same as a target gamma value Cr. The side view gamma value C4 is different from the target gamma value Cr.

Therefore, side visibility when a micro-slit pattern MS is partially formed on the pixel electrode PE is better than the side visibility when a micro-slit pattern MS is formed on substantially the entire surface of the whole pixel electrode PE.

Table 1 represents light transmittance and an average of error according to forming rate of a micro-slit pattern.

TABLE 1

|         | Light Transmittance | Average of Deviation |
|---------|---------------------|----------------------|
| 0% MS   | 5.7%                | 0.276                |
| 16% MS  | 5.6%                | 0.19                 |
| 100% MS | 5.6%                | 0.203                |

Referring to Table 1, when the micro-slit pattern MS was not formed on the pixel electrode PE (0% MS), the light transmittance was 5.7% and the average of deviation was 0.276. The average of deviation was an average of a difference between normalized front view gamma values and between normalized side view gamma values according to the gray scale. The small is average of deviation meant the good side visibility. When the micro-slit pattern MS was formed partially on the pixel electrode PE covering an area of 16% of the pixel electrode PE (16% MS), the light transmittance was 5.6% and the average of deviation was 0.19. When the micro-slit pattern MS was formed on substantially the entire surface of the pixel electrode PE (100% MS), the light transmittance was 5.6% and the average of the average of deviation was 0.203.

Referring to Table 1, the light transmittance of the pixel electrode PE including the micro-slit pattern MS was similar to the light transmittance of the pixel electrode PE without the micro-slit pattern MS. The average of deviation of the pixel electrode PE including the micro-slit pattern MS was smaller than the average of deviation of the pixel electrode PE without the micro-slit pattern MS. That is, the side visibility of the pixel electrode PE including the micro-slit pattern MS was better than the side visibility of the pixel electrode PE without the micro-slit pattern MS.

According to the present invention, by forming a micro-slit pattern on a pixel electrode, side visibility of the display panel may be improved. In addition, by using characteristics of liquid crystal molecules lying down horizontally in a direction along a micro-slit pattern, light transmittance may be increased.

It will be apparent to those skilled in the art that various modifications and variation can be made in the present invention without departing from the spirit or scope of the invention. Thus, it is intended that the present invention cover the modifications and variations is of this invention provided they come within the scope of the appended claims and their equivalents.

What is claimed is:

1. A display substrate, comprising:
a pixel electrode disposed on a base substrate and comprising a first sub-electrode, a second sub-electrode separated from the first sub-electrode, and a micro-slit pattern formed on at least one of the first sub-electrode and the second sub-electrode; and
a photoalignment film disposed on the pixel electrode and respectively dividing the first sub-electrode and the second sub-electrode into a plurality of domains.

2. The display substrate of claim 1, wherein the micro-slit pattern is formed on at least one of the entire surface of the first sub-electrode and the entire surface of the second sub-electrode.

3. The display substrate of claim 1, wherein the micro-slit pattern is formed on at least one of a portion of the first sub-electrode and a portion of the second sub-electrode.

4. The display substrate of claim 1, wherein the pixel electrode further comprises a plurality of the micro-slit patterns comprising a plurality of micro-electrodes having inclination directions parallel with a longitudinal axis of the pixel electrode, and
wherein the inclination directions of the micro-electrodes in the domains are different from each other.

5. The display substrate of claim 4, wherein the inclination directions of the micro-electrodes disposed in adjacent domains are orthogonal.

6. The display substrate of claim 5, wherein the inclination directions of the micro-electrodes disposed in the domains opposite to each other are parallel.

7. The display substrate of claim 4, wherein a width of the micro-electrode and a gap between adjacent micro-electrodes are each in the range of 3 μm to 4 μm.

8. The display substrate of claim 1, further comprising:
a first transistor connected to a gate line extended in a first direction and a first data line extended in a second direction crossing the first direction, the first transistor to output a voltage transmitted from the first data line to the first sub-electrode; and
a second transistor connected to the gate line and a second data line adjacent to the first data line, the second transistor to output a voltage transmitted from the second data line to the second sub-electrode.

9. The display substrate of claim 8, further comprising:
a color filter layer disposed between the base substrate and the pixel electrode; and
a light-blocking pattern disposed on the base substrate on which the data lines and the first transistor and the second transistor are formed.

10. A display panel, comprising:
a display substrate comprising:
a pixel electrode disposed on a base substrate and comprising a first sub-electrode, a second sub-electrode separated from the first sub-electrode, and a micro-slit pattern formed on at least one of the first sub-electrode and the second sub-electrode; and
a photoalignment film disposed on the pixel electrode and dividing the first sub-electrode and the second sub-electrode into a plurality of domains;
an opposite substrate coupled with the display substrate, the opposite substrate comprising a common electrode facing the pixel electrode; and
a liquid crystal layer disposed between the opposite substrate and the display substrate.

11. The display panel of claim 10, wherein the micro-slit pattern is formed on at least one of the entire surface of the first sub-electrode and the entire surface of the second sub-electrode.

12. The display panel of claim 10, wherein the micro-slit pattern is formed on at least one of a portion of the first sub-electrode and a portion of the second sub-electrode.

13. The display panel of claim 12, wherein the micro-slit pattern is formed from an edge of the pixel electrode toward an inside of the pixel electrode, and
wherein the length of the micro-slit pattern is in the range of 6 µm to 25 µm.

14. The display panel of claim 10, wherein the pixel electrode further comprises a plurality of the micro-slit patterns comprising a plurality of micro-electrodes having inclination directions forming an angle with a longitudinal axis of the pixel electrode, and
wherein the inclination angles of the micro-electrodes in the domains are different from each other.

15. The display panel of claim 14, wherein the inclination directions of the micro-electrodes disposed in adjacent domains are orthogonal.

16. The display substrate of claim 15, wherein the inclination directions of the micro-electrodes disposed in the domains opposite to each other are parallel.

17. The display panel of claim 10, further comprising:
a first transistor connected to a gate line extended in a first direction and a first data line extended in a second direction crossing the first direction, the first transistor to output a voltage transmitted from the first data line to the first sub-electrode; and
a second transistor connected to the gate line and a second data line adjacent to the first data line, the second transistor to output a voltage transmitted from the second data line to the second sub-electrode.

18. The display panel of claim 17, wherein the display substrate further comprises:
a color filter layer disposed between the base substrate and the pixel electrode; and
a light-blocking pattern disposed on the base substrate on which the data lines and the first transistor and the second transistor are formed.

19. The display panel of claim 17, wherein the opposite substrate further comprises:
a base substrate;
a color filter layer disposed between the base substrate and the common electrode; and
a light-blocking pattern disposed on the base substrate.

* * * * *